US012630118B2

(12) United States Patent　　(10) Patent No.:　US 12,630,118 B2

Haratake et al.　　(45) Date of Patent:　May 19, 2026

(54) CONTROL DEVICE FOR VEHICLE AND CONTROL METHOD FOR VEHICLE

(71) Applicant: TOYOTA JIDOSHA KABUSHIKI KAISHA, Toyota (JP)

(72) Inventors: Jumpei Haratake, Toyota (JP); Hirotaka Omisha, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 95 days.

(21) Appl. No.: 18/898,966

(22) Filed: Sep. 27, 2024

(65) Prior Publication Data

US 2025/0121797 A1　　Apr. 17, 2025

(30) Foreign Application Priority Data

Oct. 11, 2023　　(JP) ................................. 2023-175991

(51) Int. Cl.
B60R 25/40 (2013.01)
B60R 25/01 (2013.01)
B60W 50/14 (2020.01)

(52) U.S. Cl.
CPC ............ B60R 25/403 (2013.01); B60R 25/01 (2013.01); B60W 50/14 (2013.01); B60W 2050/146 (2013.01)

(58) Field of Classification Search
CPC ....... B60R 25/403; B60R 25/01; B60R 16/03; B60W 50/14; B60W 2050/146; B60K 35/28; B60K 35/22; B60K 2360/161;

B60L 1/00; B60L 3/00; B60L 2240/54; B60L 2240/662; B60L 2250/16; E05B 81/64; E05B 81/90; E05B 83/36

See application file for complete search history.

(56) References Cited

U.S. PATENT DOCUMENTS

2011/0213520 A1　　9/2011　Yaguchi et al.
2013/0116860 A1*　5/2013　Kawai ................ G07C 9/00309
701/1

FOREIGN PATENT DOCUMENTS

JP　　2011-176994 A　　9/2011
JP　　2013-100645 A　　5/2013
JP　　　6689907 B2　　4/2020
JP　　2022-523529 A　　4/2022
WO　　2020/173813 A1　　9/2020

* cited by examiner

*Primary Examiner* — Michael V Kerrigan
(74) *Attorney, Agent, or Firm* — Dinsmore & Shohl LLP

(57)　　ABSTRACT

A vehicle includes a door, an electric unlocking mechanism that is supplied with electric power from a battery installed in the vehicle and that also electrically unlocks the door, and a physical unlocking mechanism for manually unlocking the door. A control device of the vehicle includes an annunciation circuit that performs annunciation of predetermined information to a user of the vehicle. The annunciation circuit performs annunciation to the user of at least one piece of information of a position of the physical unlocking mechanism, and how to unlock the door by the physical unlocking mechanism, when an amount of charge of the battery is smaller than a predetermined threshold value.

20 Claims, 9 Drawing Sheets

NOTIFICATION
ABOUT MANUALLY
UNLOCKING DOOR

Learn more

31k

CONTROL DEVICE FOR VEHICLE AND CONTROL METHOD FOR VEHICLE

CROSS-REFERENCE TO RELATED APPLICATION

This application claims priority to Japanese Patent Application No. 2023-175991 filed on Oct. 11, 2023, incorporated herein by reference in its entirety.

BACKGROUND

1. Technical Field

The present disclosure relates to a control device for a vehicle and a control method therefor.

2. Description of Related Art

Japanese Patent No. 06689907 discloses a control device that moves a window in a closing direction when a remaining battery charge of a drive battery installed in a vehicle is below a predetermined value.

SUMMARY

Here, although not explicitly described in the above-mentioned Japanese Patent No. 06689907, there are cases in which a mechanism for electrically unlocking a vehicle door is provided. In this case, when the charge in the battery decreases, the door cannot be unlocked by the above mechanism. Also, there are cases in which users, who usually unlock doors electrically, are not aware of how to manually unlock the door. Accordingly, there are cases in which the user is not able to exit the vehicle.

The present disclosure has been made to solve the above problems, and an object thereof is to provide a control device and a control method that can suppress situations from occurring in which a user is unable to exit a vehicle equipped with an electrically-unlocked door.

A first aspect of the present disclosure is a control device of a vehicle. The vehicle includes a door, an electric unlocking mechanism that is supplied with electric power from a battery installed in the vehicle and that also electrically unlocks the door, and a physical unlocking mechanism for manually unlocking the door. The control device includes an annunciation circuit for performing annunciation of predetermined information to a user of the vehicle. The annunciation circuit is configured to, when an amount of charge of the battery is smaller than a predetermined threshold value, perform annunciation to the user of at least one piece of information of a position of the physical unlocking mechanism, and how to unlock the door by the physical unlocking mechanism.

As described above, when the amount of charge of the battery becomes smaller than the predetermined threshold value, the control device performs annunciation to the user regarding at least one piece of information of the position of the physical unlocking mechanism, and how to unlock the door using the physical unlocking mechanism. Thus, even when unlocking by the electric unlocking mechanism cannot be performed due to insufficient amount of charge of the battery, the user can still perform unlocking by using the physical unlocking mechanism, based on the information that is announced by the annunciation unit. As a result, situations in which the user is not able to exit a vehicle equipped with an electrically unlocked door can be suppressed.

In the control device, the annunciation circuit may cause a display device to display the at least one piece of information when the amount of charge is smaller than the predetermined threshold value. According to this configuration, the user can easily unlock the door using the physical unlocking mechanism, based on the information displayed on the display device.

In the control device, wherein the display device may include at least one of a display installed in the vehicle and a user terminal not installed in the vehicle. According to this configuration, the user can operate the physical unlocking mechanism of the vehicle by viewing the information displayed on the display of the vehicle, and accordingly the user can operate the physical unlocking mechanism more easily than when performing operations of the physical unlocking mechanism by viewing a mobile device held in hand. Also, displaying at least one of the pieces of information on the user terminal enables the at least one piece of information to be displayed, regardless of the amount of charge of the battery of the vehicle.

The door may include a proximity door located closest to the user riding in the vehicle. In the control device, the annunciation circuit may be configured to, when the amount of charge is smaller than the predetermined threshold value, perform annunciation of at least one piece of information of a position of the physical unlocking mechanism corresponding to the proximity door, and how to unlock the proximity door by the physical unlocking mechanism, to the user. According to this configuration, information regarding the physical unlocking mechanism of the proximity door closest to the user can be announced to the user. As a result, the physical unlocking mechanism can be made to be easier for the user to operate.

In the control device, the annunciation circuit may be configured to end annunciation of the at least one piece of information to the user when the door is unlocked by the physical unlocking mechanism while annunciation of the at least one piece of information is being performed to the user. According to this configuration, wasteful consumption of electric power following the door being unlocked by the physical unlocking mechanism can be suppressed. Accordingly, for example, electric power and so forth can be reserved for communicating to the outside through a communication device or the like, that the amount of charge in the battery is low.

In the control device, the annunciation circuit may be configured to end annunciation of the at least one piece of information to the user when charging of the battery is started while annunciation of the at least one piece of information is being performed to the user. According to this configuration, while the battery is being charged, consumption of electric power due to the annunciation of the information can be suppressed.

The control device may further include an unlocking mechanism control circuit configured to drive the electric unlocking mechanism. The unlocking mechanism control circuit may be configured to unlock the door by the electric unlocking mechanism when the door is not unlocked by the physical unlocking mechanism within a predetermined amount of time following annunciation of the at least one piece of information being performed to the user. According to this configuration, situations in which the user is trapped in the vehicle, when the user is unable to operate the physical unlocking mechanism or the like, for example, can be suppressed.

In the control device, the annunciation circuit may be configured to perform annunciation of the at least one piece of information to the user when the user is riding in the vehicle and also when the amount of charge is smaller than the predetermined threshold value. According to this configuration, situations in which annunciation of the at least one piece of information is performed to a user who is not riding in the vehicle can be suppressed.

In the control device, the annunciation circuit may be configured to perform annunciation of the at least one piece of information to the user when an outside temperature is higher than a predetermined temperature and also the amount of charge is smaller than the predetermined threshold value. According to this configuration, situations in which the user is trapped in the vehicle inside which the temperature is high due to the high outside temperature can be suppressed.

A second aspect of the present disclosure is a control device of a vehicle. The vehicle includes a door, an electric unlocking mechanism that is supplied with electric power from a battery installed in the vehicle and that also electrically unlocks the door, and a physical unlocking mechanism for manually unlocking the door. The control device may include a transmission circuit for transmitting information of the vehicle to an external device that is outside of the vehicle. The transmission circuit is configured to, when an amount of charge of the battery is smaller than a predetermined threshold value, transmit, to the external device, at least one piece of information of a position of the physical unlocking mechanism, and how to unlock the door by the physical unlocking mechanism.

As described above, when the amount of charge of the battery becomes smaller than the predetermined threshold value, the control device transmits, to the external device, at least one piece of information of the position of the physical unlocking mechanism, and how to unlock the door using the physical unlocking mechanism. Thus, the user can obtain the at least one piece of information through the external device, and accordingly can unlock the door using the physical unlocking mechanism. As a result, situations in which the user is not able to exit a vehicle equipped with an electrically unlocked door can be suppressed.

A third aspect of the present disclosure is a control method of a vehicle. The vehicle includes a door, an electric unlocking mechanism that is supplied with electric power from a battery installed in the vehicle and that also electrically unlocks the door, a physical unlocking mechanism for manually unlocking the door, and a control device. The control method includes, as an annunciation process, the control device performing annunciation of predetermined information to a user of the vehicle. The annunciation process includes a process of performing annunciation to the user of at least one piece of information of a position of the physical unlocking mechanism, and how to unlock the door by the physical unlocking mechanism, when an amount of charge of the battery is smaller than a predetermined threshold value.

According to the above control method, as described above, when the amount of charge becomes smaller than the predetermined threshold value, annunciation is performed to the user regarding at least one piece of information of the position of the physical unlocking mechanism, and how to unlock the door using the physical unlocking mechanism. Thus, a control method that can suppress situations in which a user is unable to exit a vehicle equipped with an electrically unlocked door can be provided.

In the control method, the annunciation process may include a process of the control device causing a display device to display the at least one piece of information when the amount of charge is smaller than the predetermined threshold value. According to this configuration, a control method can be provided in which the user can easily unlock the door using the physical unlocking mechanism, based on the information displayed on the display device.

In the control method, the annunciation process may include a process of the control device causing the display device, including at least one of a display installed in the vehicle and a user terminal not installed in the vehicle, to display the at least one piece of information, when the amount of charge is smaller than the predetermined threshold value. With this configuration, a control method can be provided in which the user can operate the physical unlocking mechanism more easily than when performing operations of the physical unlocking mechanism by viewing a mobile device or the like that is held in hand. Also, displaying at least one of the pieces of information on the user terminal enables a control method to be provided in which the at least one piece of information can be displayed, regardless of the amount of charge of the battery of the vehicle.

The door may include a proximity door located closest to the user riding in the vehicle. In the control method, the annunciation process may include a process of the control device performing annunciation to the user of at least one piece of information of a position of the physical unlocking mechanism corresponding to the proximity door, and how to unlock the proximity door by the physical unlocking mechanism, when the amount of charge is smaller than the predetermined threshold value. According to this configuration, a control method can be provided in which the user can more easily operate the physical unlocking mechanism.

The control method may further include the control device ending annunciation of the at least one piece of information to the user, when the door is unlocked by the physical unlocking mechanism while annunciation of the at least one piece of information is being performed to the user. According to this configuration, a control method can be provided that can reserve electric power or the like for communicating to the outside through a communication device or the like that the amount of charge of the battery is low, for example.

The control method may further include the control device ending annunciation of the at least one piece of information to the user, when charging of the battery is started while annunciation of the at least one piece of information is being performed to the user. According to this configuration, while the battery is being charged, consumption of electric power due to the annunciation of the information can be suppressed.

The control method may further include the control device unlocking the door by the electric unlocking mechanism, when the door is not unlocked by the physical unlocking mechanism within a predetermined amount of time following annunciation of the at least one piece of information being performed to the user. According to this configuration, a control method can be provided that can suppress situations in which the user is trapped in the vehicle, when the user is unable to operate the physical unlocking mechanism or the like, for example.

In the control method, the annunciation process may include a process of the control device performing annunciation of the at least one piece of information to the user when the user is riding in the vehicle and also the amount of charge is smaller than the predetermined threshold value. According to this configuration, a control method can be provided that can suppress situations in which annunciation of the at least one piece of information is performed to a user who is not riding in the vehicle.

In the control method, the annunciation process may include a process of the control device performing annunciation to the user of the at least one piece of information when an outside temperature is higher than a predetermined temperature and also the amount of charge is smaller than the predetermined threshold value. According to this configuration, a control method can be provided that can suppress situations in which the user is trapped in the vehicle inside which the temperature is high due to the high outside temperature.

In the control method, the annunciation process may include a process of the control device transmitting the at least one piece of information to an external device that is outside of the vehicle when the amount of charge is smaller than the predetermined threshold value. According to this configuration, a control method can be provided that enables the user to obtain the at least one piece of information with the external device.

According to the present disclosure, situations in which a user is unable to exit a vehicle provided with a door that is electrically unlocked can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a first diagram illustrating a navigation display displaying information regarding a physical unlocking mechanism according to the embodiment;

FIG. 5 is a second diagram illustrating the navigation display displaying information regarding the physical unlocking mechanism according to the embodiment;

DETAILED DESCRIPTION OF EMBODIMENTS

An embodiment of the present disclosure will be described in detail below with reference to the drawings. The same or corresponding parts are denoted by the same signs throughout the drawings, and description thereof will not be repeated.

Figures 1, 2:
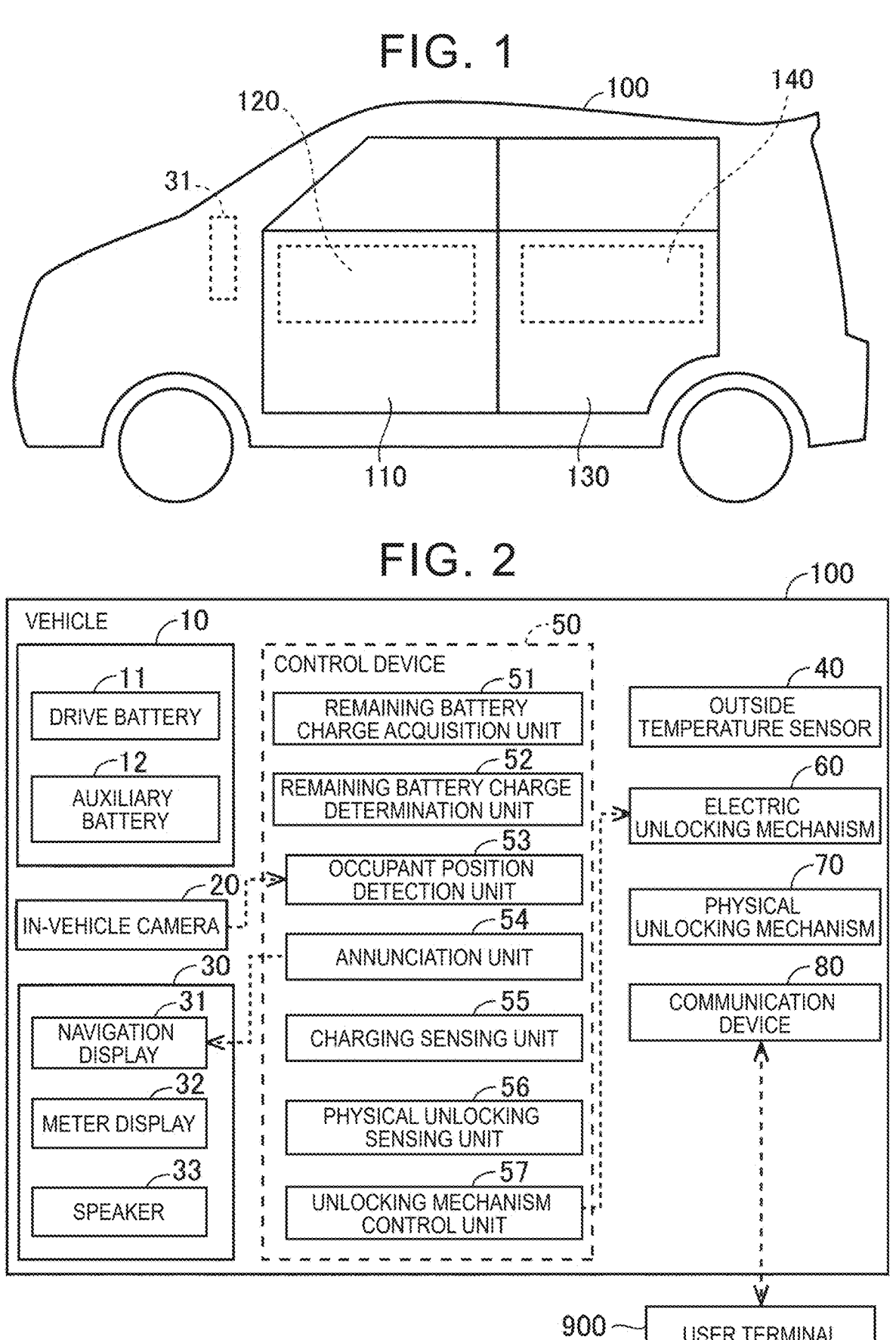
FIG. 1 is a diagram illustrating a configuration of a vehicle according to an embodiment.
FIG. 2 is a block diagram illustrating a detailed configuration of the vehicle according to the embodiment.

FIG. 1 is a side view of a vehicle 100 in which a control device 50 (see FIG. 2) according to the present embodiment is installed. The vehicle 100 includes a door 110 for a front seat and a door 130 for a rear seat. The vehicle 100 also includes a navigation display 31. Note that the navigation display 31 is an example of a "display device" and a "display" in the present disclosure.

A door inner-side portion 120 on which various types of switches and so forth are installed is disposed on a face of the door 110, on a vehicle cabin side thereof. A door inner-side portion 140 on which various types of switches and so forth are installed is disposed on a face of the door 130, on the vehicle cabin side thereof. Details of each of the door inner-side portion 120 and the door inner-side portion 140 will be described later.

FIG. 2 is a block diagram illustrating a detailed configuration of the vehicle 100. In the example illustrated in FIG. 2, the vehicle 100 is an electrified vehicle such as a battery electric vehicle (BEV), a plug-in hybrid electric vehicle (PHEV), or the like. The vehicle 100 includes a power storage device 10, an in-vehicle camera 20, a human-machine interface (HMI) device 30, an outside temperature sensor 40, the control device 50, an electric unlocking mechanism 60, a physical unlocking mechanism 70, and a communication device 80. The electric unlocking mechanism 60 and the physical unlocking mechanism 70 each include an unlocking mechanism for the door 110 and the door 130, respectively.

The power storage device 10 includes a drive battery 11 and an auxiliary battery 12. The drive battery 11 stores electric power used for the vehicle 100 to travel and so forth (electric motor and so forth). The auxiliary battery 12 supplies electric power to various types of functional equipment provided in the vehicle, such as a power source for a system, an electronic control unit (ECU), the navigation display 31, and so forth. Note that the auxiliary battery 12 is an example of "battery" in the present disclosure.

When an electric power amount in the auxiliary battery 12 becomes low, electric power is transferred from the drive battery 11 to the auxiliary battery 12. For example, when a state of charge (SOC) of the auxiliary battery 12 falls below 15%, the above transfer is performed.

The in-vehicle camera 20 acquires images of the interior of the vehicle 100. Just one in-vehicle camera 20 may be provided in the vehicle 100, or a plurality of the in-vehicle cameras 20 may be provided in the vehicle 100.

The HMI device 30 includes the navigation display 31, a meter display 32, a speaker 33, and so forth. The outside temperature sensor 40 detects the outside temperature.

The control device 50 includes a remaining battery charge acquisition unit 51, a remaining battery charge determination unit 52, an occupant position detection unit 53, an annunciation unit 54, a charging sensing unit 55, a physical unlocking sensing unit 56, and an unlocking mechanism control unit 57. Each of the remaining battery charge acquisition unit 51, the remaining battery charge determination unit 52, the occupant position detection unit 53, the annunciation unit 54, the charging sensing unit 55, the physical unlocking sensing unit 56, and the unlocking mechanism control unit 57 indicates software in which functional features of the control device 50 are illustrated as blocks. Details of each function will be described later. The annunciation unit 54 is an example of "annunciation circuit" in the present disclosure, and the unlocking mechanism control unit 57 is an example of "unlocking mechanism control circuit" in the present disclosure.

The remaining battery charge acquisition unit 51 acquires information regarding the state of charge (SOC) of the auxiliary battery 12. The remaining battery charge determination unit 52 determines whether the state of charge (SOC) of the auxiliary battery 12 is below a predetermined value. The occupant position detection unit 53 detects that a user is riding in the vehicle 100, and detects a position of the user riding in the vehicle 100. The annunciation unit 54 notifies the user of the vehicle 100 of predetermined information.

The charging sensing unit 55 senses that the auxiliary battery 12 is being charged. The physical unlocking sensing unit 56 senses that the physical unlocking mechanism 70 has unlocked the door 110 (130). The unlocking mechanism control unit 57 drives the electric unlocking mechanism 60.

The electric unlocking mechanism 60 is a mechanism for unlocking each of the doors 110 and 130 of the vehicle 100 (releasing an electronic lock). The electric unlocking mechanism 60 electrically unlocks each of the doors 110 and 130 that are in a locked state.

The physical unlocking mechanism 70 is a mechanism for unlocking each of the doors 110 and 130 of the vehicle 100 (releasing a mechanical lock). The physical unlocking mechanism 70 physically unlocks each of the doors 110 and 130 that are in a locked state.

The communication device 80 includes various types of communication interfaces. The communication device 80 performs wireless communication with a communication device that is outside of the vehicle 100. For example, the communication device 80 communicates with a user terminal 900 (smartphone, smart watch, personal computer (PC), or the like) that is owned by the user of the vehicle 100. Also, the communication device 80 may be configured to be capable of accessing the Internet.

Sequence Control by Control Device and Navigation Display

Figure 3:
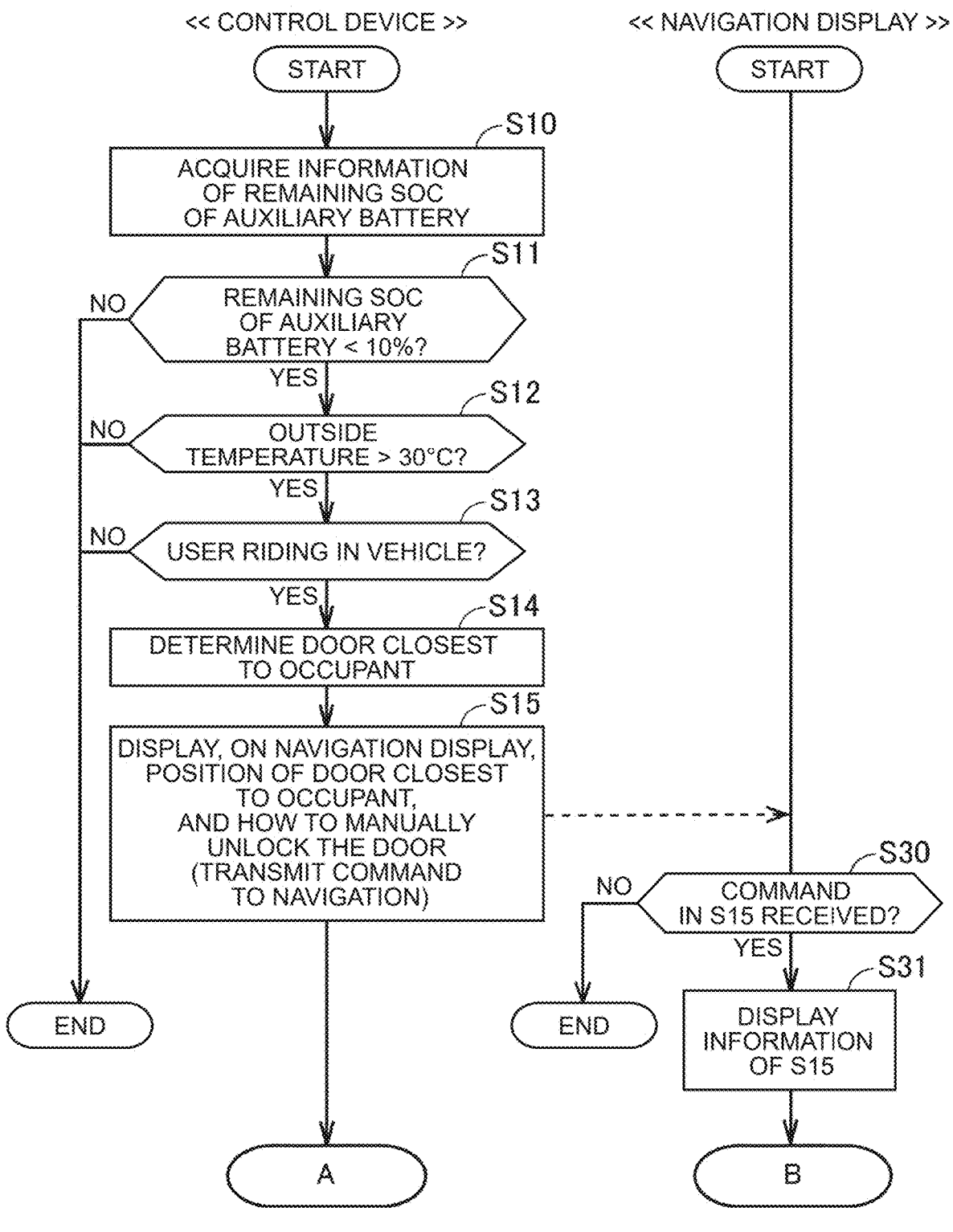
FIG. 3 is a sequence diagram showing control by a control device and a navigation display according to the embodiment.

FIG. 3 is a diagram showing sequence control (control method) by the control device 50 and the navigation display 31. The sequence shown in FIG. 3 may be periodically executed at predetermined time intervals (e.g., once every minute). Also, the sequence control in FIG. 3 may be executed only when the vehicle 100 is stopped.

In step S10, the control device 50 (remaining battery charge acquisition unit 51) acquires information regarding remaining SOC of the auxiliary battery 12.

In step S11, the control device 50 (remaining battery charge determination unit 52) determines whether the remaining SOC of the auxiliary battery 12 of which the information was acquired in step S10 is below 10%. The threshold value of 10% is a value set in advance in the control device 50. When the SOC of the auxiliary battery 12 is below 10% (Yes in S11), the processing advances to step S12. When the SOC of the auxiliary battery 12 is no lower than 10% (No in S11), the processing ends.

In step S12, the control device 50 determines whether the outside temperature is higher than 30° C. The control device 50 performs the determination in step S12 based on the detected value of the outside temperature sensor 40 (see FIG. 2). When the outside temperature is higher than 30° C. (Yes in S12), the processing advances to step S13. When the outside temperature is no higher than 30° C. (No in S12), the processing ends.

In step S13, the control device 50 (occupant position detection unit 53) determines whether a user is riding in vehicle 100. The control device 50 (occupant position detection unit 53) performs the determination in step S13 based on an image captured by the in-vehicle camera 20. When the user is riding in the vehicle 100 (Yes in S13), the processing advances to step S14. When no user is riding in the vehicle 100 (No in S13), the processing ends.

In step S14, the control device 50 (occupant position detection unit 53) determines the door that is closest to the occupant. For example, when the user is only in the driver's seat, the control device 50 (occupant position detection unit 53) determines the door 110 to be the door closest to the occupant. In this case, the door 110 is an example of "proximity door" in the present disclosure. Also, when the user is only in the rear seat, the control device 50 (occupant position detection unit 53) determines the door 130 to be the door closest to the occupant. In this case, the door 130 is an example of "proximity door" in the present disclosure. Also, when there are users in each of the driver's seat and the rear seat, the control device 50 (occupant position detection unit 53) determines each of the door 110 and the door 130 to be the door closest to the occupant. In this case, each of the door 110 and the door 130 is an example of "proximity door" in the present disclosure. In the following, the door 110 is assumed to be the door closest to the occupant.

In step S15, the control device 50 (annunciation unit 54) displays a position of the physical unlocking mechanism 70 corresponding to the door 110 closest to the occupant, and how to unlock the door 110 by the physical unlocking mechanism 70, on the navigation display 31. Specifically, the control device 50 (annunciation unit 54) performs processing of transmitting a command (control signal) to the navigation display 31 to display the above information (hereinafter sometimes referred to as annunciation processing). The processing then advances to step A. The description of step A and thereafter will be described later with reference to FIG. 6.

In step S30, the navigation display 31 determines whether the command (control signal) in step S15 has been received. When the command (control signal) in S15 has been received (Yes in S30), the processing advances to step S31. When no command (control signal) in S15 has been received (No in S30), the processing ends.

In step S31, the navigation display 31 displays the information from step S15 (the position of the physical unlocking mechanism 70 corresponding to the door 110, and how to unlock the door 110 by the physical unlocking mechanism 70). The processing then advances to step B. The description of step B and thereafter will be described later with reference to FIG. 6.

Figures 4, 5:
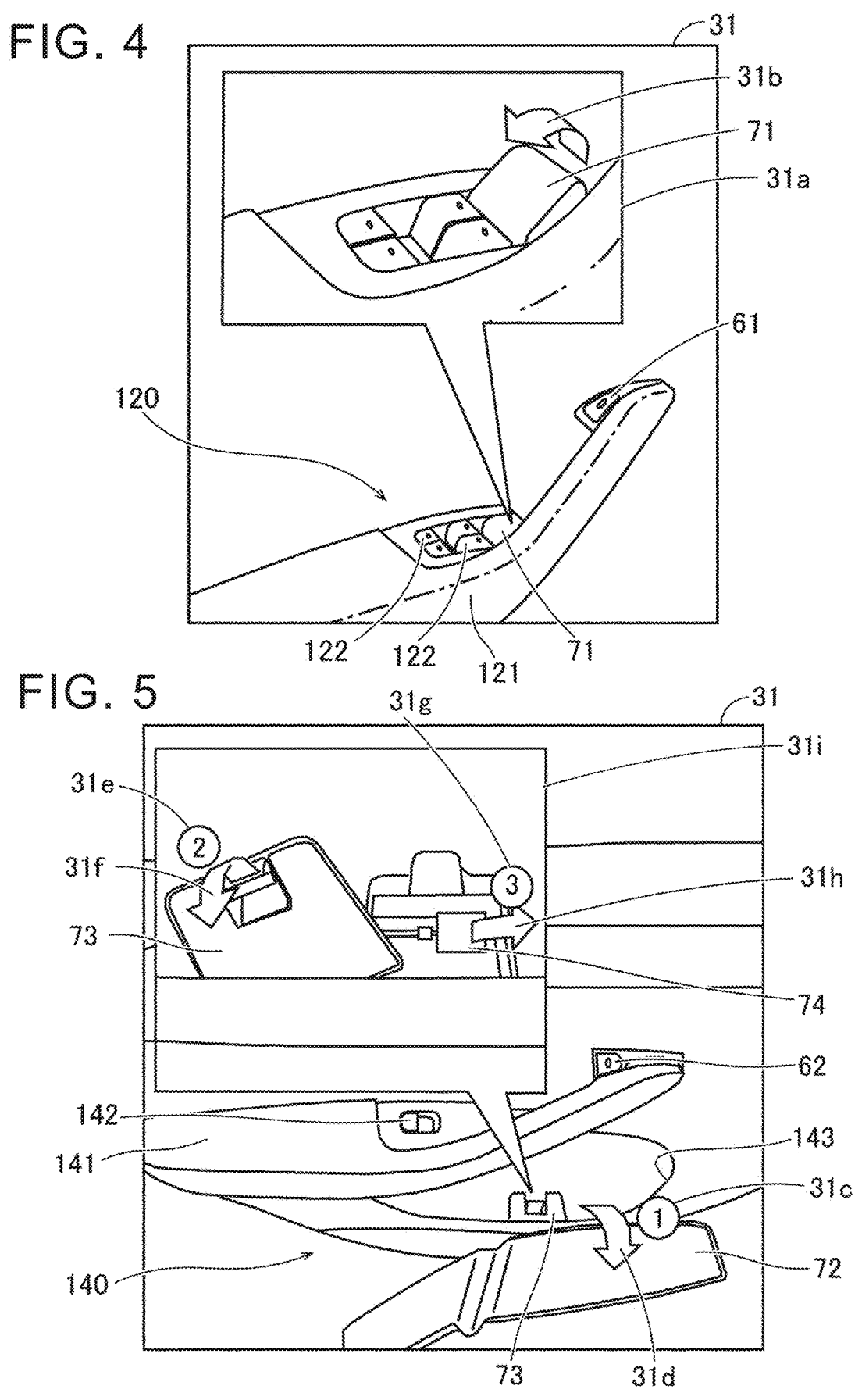

FIG. 4 illustrates an example of a screen displayed on the navigation display 31 in step S31. The door inner-side portion 120 corresponding to the door 110 is displayed on the navigation display 31 illustrated in FIG. 4.

The door inner-side portion 120 is provided with an armrest 121 on which various types of switches are disposed, a plurality of window buttons 122, a lever 71, and a door open/close button 61. The window buttons 122, the lever 71, and the door open/close button 61 are disposed on the armrest 121. Note that the door open/close button 61 and the lever 71 are included in the electric unlocking mechanism 60 and the physical unlocking mechanism 70, respectively.

Operating one of the window buttons 122 opens (or closes) a window corresponding to the window button 122 that is operated.

Pressing the door open/close button 61 controls the electric unlocking mechanism 60 and the door 110 is electrically unlocked.

By pulling up the lever 71, the door 110 is physically unlocked by the physical unlocking mechanism 70. Note that the lever 71 is adjacent to the window buttons 122 and also is disposed at a position spaced apart from the door open/close button 61.

In the screen illustrated in FIG. 4, an enlarged screen 31*a*, demonstrating details of how to operate the lever 71, is displayed. An arrow 31*b*, indicating how to operate the lever 71, is displayed on the enlarged screen 31*a*. Note that the image displayed on the navigation display 31 may be a still image or a moving image.

FIG. 5 illustrates, as a modification of FIG. 4, a screen displayed on the navigation display 31 when the door 130 is determined to be the door closest to the occupant. The door inner-side portion 140 corresponding to the door 130 is displayed on the navigation display 31 illustrated in FIG. 5.

The door inner-side portion 140 is provided with an armrest 141 on which various types of switches are disposed, a window button 142, a pocket 143, and a door open/close button 62. The window button 142 and the door open/close button 62 are disposed on the armrest 141. Note that the door open/close button 62 is a mechanism included in the electric unlocking mechanism 60.

Operating the window button 142 opens (or closes) a window of the door 130.

Pressing the door open/close button 62 controls the electric unlocking mechanism 60 and the door 130 is electrically unlocked.

The screen illustrated in FIG. 5 indicates steps of how to unlock the door 130 using the physical unlocking mechanism 70. The screen illustrated in FIG. 5 indicates the steps of how to manually unlock for the door 130, using sets of numbers (1 to 3) and arrows. First, a first step is a step of removing a mat 72 from a bottom of the pocket 143, as indicated by a mark 31*c* displaying the number "1", and an arrow 31*d*. A second step is a step of removing an access door 73 provided below the mat 72, as indicated by a mark 31*e* displaying the number "2", and an arrow 31*f*. A third step is a step of pulling on a cable 74 provided below the access door 73, as indicated by a mark 31*g* displaying the number "3", and an arrow 31*h*. Note that the second step and the third step are displayed on an enlarged screen 31*i*. Also, each of the mat 72, the access door 73, and the cable 74 is a mechanism included in the physical unlocking mechanism 70.

Figure 6:
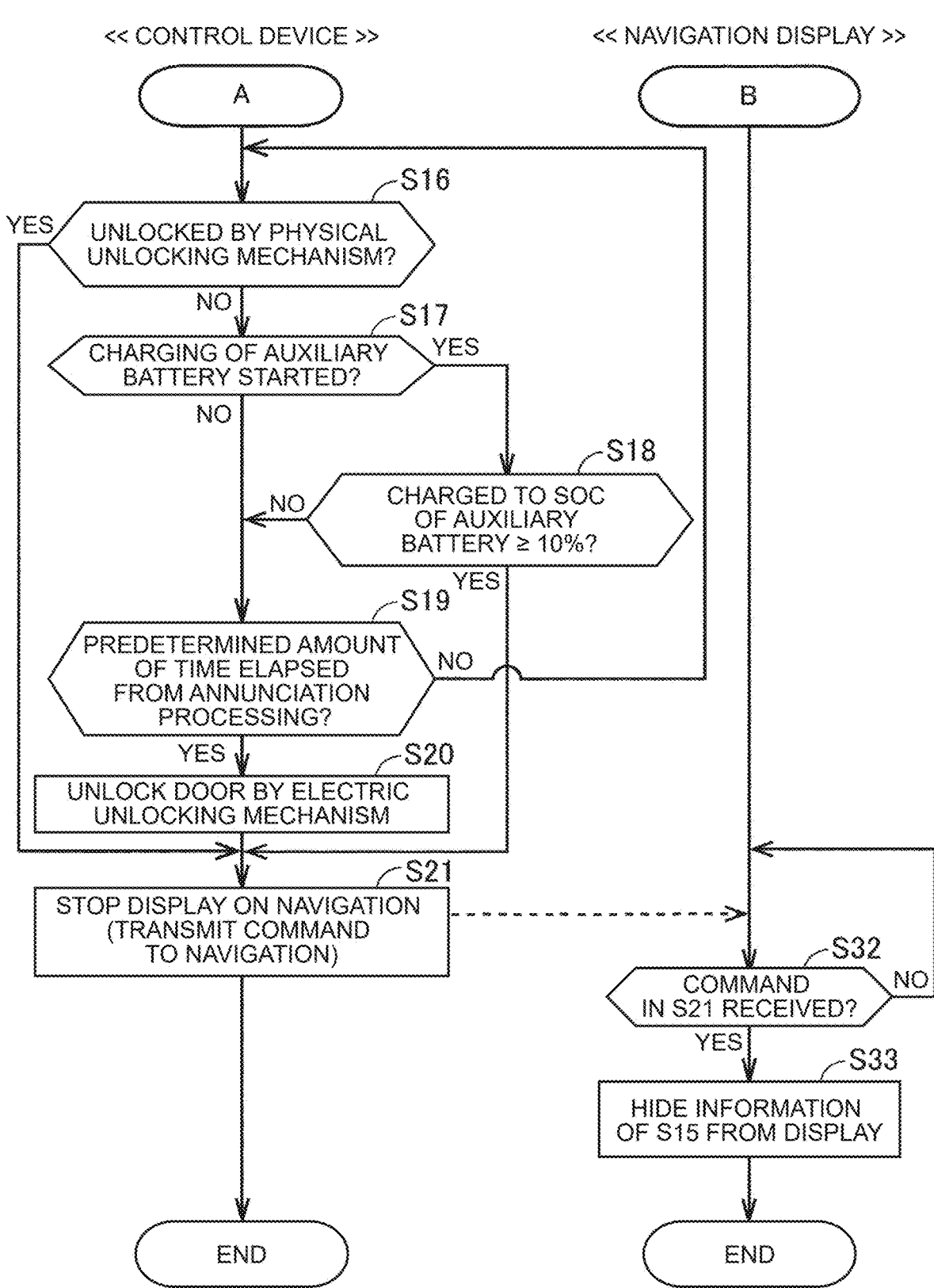
FIG. 6 is a sequence diagram showing a continuation of sequence control in FIG. 3.

FIG. 6 is a sequence diagram showing a continuation of the sequence control in FIG. 3. In step S16, the control device 50 (physical unlocking sensing unit 56) determines whether the door 110 has been unlocked by the physical unlocking mechanism 70. That is to say, the control device 50 (physical unlocking sensing unit 56) determines whether the door 110 has been unlocked by the physical unlocking mechanism 70 while the position of the physical unlocking mechanism 70 corresponding to the door 110 and how to unlock the door 110 by the physical unlocking mechanism 70 are displayed on the navigation display 31. When the physical unlocking mechanism 70 has unlocked the door (Yes in S16), the processing advances to step S21. When the physical unlocking mechanism 70 has not unlocked the door (No in S16), the processing advances to step S17.

In step S17, the control device 50 (charging sensing unit 55) determines whether charging of the auxiliary battery 12 has started. That is to say, the control device 50 (physical unlocking sensing unit 56) determines whether charging of the auxiliary battery 12 has started while the position of the physical unlocking mechanism 70 corresponding to the door 110 and how to unlock the door 110 by the physical unlocking mechanism 70 are displayed on the navigation display 31. The control device 50 (charging sensing unit 55) may determine that charging of the auxiliary battery 12 has started (charging is being executed) upon detecting that the SOC of the auxiliary battery 12 has increased in a state in which a charging plug (omitted from illustration) is connected to an inlet (omitted from illustration) of the vehicle 100. When charging of the auxiliary battery 12 has started (Yes in S17), the processing advances to step S18. When charging of the auxiliary battery 12 has not started (No in S17), the processing advances to step S19.

In step S18, the control device 50 (remaining battery charge determination unit 52) determines whether the auxiliary battery 12 has been charged until the SOC thereof is no lower than 10%. When the SOC of the auxiliary battery 12 is no lower than 10% (Yes in S18), the processing advances to step S21. When the SOC is below 10% (No in S18), the processing advances to step S19.

In step S19, the control device 50 determines whether a predetermined amount of time (e.g., 10 minutes) has elapsed since the position of the physical unlocking mechanism 70 corresponding to the door 110 and how to unlock the door 110 by the physical unlocking mechanism 70 was displayed on the navigation display 31 (the above annunciation processing was executed). That is to say, the control device 50 determines whether the door 110 has not been unlocked by the physical unlocking mechanism 70 within a predetermined amount of time following the above annunciation processing being executed. When the predetermined amount of time has elapsed (when the door 110 has not been unlocked by the physical unlocking mechanism 70 within the predetermined amount of time) (Yes in S19), the processing advances to step S20. When the predetermined amount of time has not elapsed (No in S19), the processing returns to step S16.

In step S20, the control device 50 (unlocking mechanism control unit 57) controls the electric unlocking mechanism 60 to electrically unlock the door 110. At this time, the control device 50 (unlocking mechanism control unit 57) transmits, to the electric unlocking mechanism 60, a command (control signal) to drive the electric unlocking mechanism 60 (to cause the electric unlocking mechanism 60 to unlock the door 110). In this case, the door 110 may be left in an ajar state, for example, or may be completely unlocked.

In step S21, the control device 50 (annunciation unit 54) ends displaying of the position of the physical unlocking mechanism 70 corresponding to the door 110, and how to unlock the door 110 by the physical unlocking mechanism 70, on the navigation display 31. Specifically, the control device 50 (annunciation unit 54) transmits a command (control signal) to the navigation display 31, to stop the display.

In step S32, the navigation display 31 determines whether the command (control signal) in step S21 has been received. When the command (control signal) in S21 has been received (Yes in S32), the processing advances to step S33. When no command (control signal) in S21 has been received (No in S32), the processing of step S32 is repeated.

In step S33, the navigation display 31 hides from display the information from step S15 (the position of the physical unlocking mechanism 70 corresponding to the door 110, and how to unlock the door 110 by the physical unlocking mechanism 70).

Note that the sequence shown in FIG. 6 is an example, and the present disclosure is not limited to the example shown in FIG. 6. For example, execution one or more of the determination processing in steps S16 to S19 in FIG. 6 may be omitted. For example, execution all of the determination processing in steps S16 to S19 may be omitted.

As described above, according to the present embodiment, when the amount of charge of the auxiliary battery 12 falls below 10%, the annunciation unit 54 performs annunciation to the user regarding the position of the physical unlocking mechanism 70 corresponding to the door 110, and information regarding how to unlock the door 110 using the physical unlocking mechanism 70. Thus, information regarding the physical unlocking mechanism 70 can be notified to the user before the electric unlocking mechanism 60 stops operating due to insufficient amount of charge of the auxiliary battery 12. As a result, even when the electric unlocking mechanism 60 stops operating, the user can still unlock the door 110 using the physical unlocking mechanism 70.

In the embodiment described above, an example is described in which annunciation is performed to the user regarding both the position of the physical unlocking mechanism and how to unlock, using the physical unlocking mechanism, but the present disclosure is not limited thereto. Annunciation may be performed to the user of just one of the position of the physical unlocking mechanism and how to unlock using the physical unlocking mechanism.

In the above embodiment, an example is described in which annunciation of information regarding the physical unlocking mechanism is performed when the SOC of the auxiliary battery 12 falls below 10%, but the present disclosure is not limited thereto. The above annunciation processing may be executed when the remaining electric power amount of the auxiliary battery 12 (1) reaches an electric power amount that is minimally required to execute the annunciation processing, (2) falls below an electric power amount that is minimally required to perform electrical unlocking of the door, (3) falls below an electric power amount at which electrically unlocking the door is not possible but the annunciation processing can be performed, or falls below an electric power amount obtained by adding a predetermined amount to the electric power amounts of (1) and (2).

In the above embodiment, an example is described in which each of the control device 50 and the electric unlocking mechanism 60 is supplied with electric power from the auxiliary battery 12, but the present disclosure is not limited thereto. At least one of the control device 50 and the electric unlocking mechanism 60 may be supplied with electric power from the drive battery 11.

Although the above embodiment describes an example in which information regarding the physical unlocking mechanism 70 is displayed on the navigation display 31, the present disclosure is not limited thereto. For example, when a user is riding in the rear seat, the above information may be displayed on a rear seat display. Also, when users are seated in each of the driver's seat and a passenger seat, the screen of the navigation display 31 may be divided into two. Information regarding the physical unlocking mechanism 70 corresponding to a driver's door may be displayed on one half of the divided screen, and also information regarding the physical unlocking mechanism 70 corresponding to a passenger door may be displayed on the other half of the divided screen.

Reference Example

It is also conceivable for the door to be unlocked by an electric unlocking mechanism in accordance with the amount of charge of a battery (e.g., an auxiliary battery) becoming smaller than a predetermined threshold value. In this case, the door is unlocked (in an ajar state or in a completely unlocked state) by the electric unlocking mechanism without executing the annunciation processing of the embodiment described above.

In the above embodiment, an example is described in which the annunciation processing is executed when the user is riding in the vehicle 100, and also the amount of charge of the auxiliary battery 12 becomes smaller than a predetermined threshold value, but the present disclosure is not limited thereto. The annunciation processing may be executed even when the user is not riding in the vehicle 100.

In the above embodiment, an example is described in which the annunciation processing is executed when the outside temperature is higher than a predetermined temperature, and also the amount of charge of the auxiliary battery 12 becomes smaller than the predetermined threshold value, but the present disclosure is not limited to this. The annunciation processing may be executed even when the outside temperature is below the predetermined temperature.

Although the above embodiment describes an example in which the annunciation processing is executed based on the detected value of the outside temperature sensor 40 installed in the vehicle 100, the present disclosure is not limited thereto. The annunciation processing may be executed based on a detection value of a temperature sensor provided outside of the vehicle, temperature information on the Internet, or the like.

In the above embodiment, an example is described in which the number of occupants and the positions of the occupants in the vehicle 100 are sensed based on images captured by the in-vehicle camera 20, but the present disclosure is not limited thereto. For example, a weight sensor or a human-presence sensor provided in the vehicle may be used.

In the above embodiment, an example has been set forth in which the annunciation processing is simply to display information regarding the physical unlocking mechanism on the navigation display 31 or the like, but the present disclosure is not limited to this. For example, when the surroundings are dark, such as at night, in addition to displaying the above information, processing of illuminating the physical unlocking mechanism may be performed as annunciation processing. In this case, the threshold value of the state of charge (SOC) of the auxiliary battery 12 (10% in the above embodiment) may be increased by a predetermined amount (for example, 2%) to compensate for the amount of electric power used for illumination, or alternatively, a period of displaying the information on the navigation display 31 may be shortened.

In the above embodiment, an example is described in which an image indicating the position of the physical unlocking mechanism 70, or the like, is displayed on the navigation display 31 when the amount of charge of the auxiliary battery 12 becomes smaller than the predetermined threshold value, but the present disclosure is not limited thereto. When the amount of charge of the auxiliary battery 12 becomes smaller than the predetermined threshold value, a pop-up display 31*j* illustrated in FIG. 7 may be displayed on the navigation display 31 or the like. The pop-up display 31*j* includes a button 31*k* labeled "Learn more" along with a message, "Notification about manually unlocking door". When the button 31*k* is selected, explanatory text describing the position of the physical unlocking mechanism 70 and how to unlock using the physical unlocking mechanism 70, or the images and so forth in FIGS. 4 and 5, are displayed on the navigation display 31 or the like. Note that when the button 31*k* is not selected within a predetermined period of time (e.g., one minute) following the button 31*k* being displayed, the above explanatory text and images such as in FIGS. 4 and 5 may be automatically displayed on the navigation display 31, or the like.

In the above embodiment, an example is described in which starting of charging of the auxiliary battery 12 is sensed when the SOC of the auxiliary battery 12 increases in a state in which the charging plug is connected, but the present disclosure is not limited thereto. For example, when the SOC of the battery installed in the vehicle increases due to replacement of the battery, charging of the battery may be sensed.

In the above embodiment, an example is described in which the annunciation processing is ended when the SOC of the auxiliary battery 12 is charged to 10% or higher, following annunciation to the user, but the present disclosure is not limited to this. When the SOC of the auxiliary battery 12 increases even slightly due to charging (e.g., when the SOC increases by 1% or more) following annunciation to the user, the annunciation processing may be executed.

Figures 7, 8:
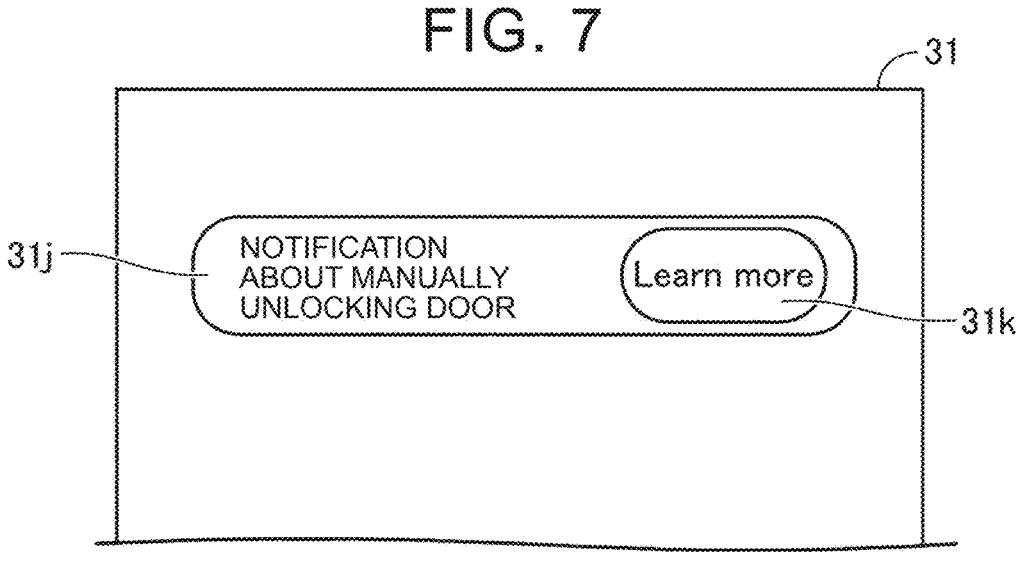
FIG. 7 is a diagram illustrating a pop-up display displayed on the navigation display according to a modification of the embodiment.
FIG. 8 is a diagram illustrating a first modification of FIG. 4.

FIG. 8 is a diagram illustrating a first modification of FIG. 4. In the example illustrated in FIG. 8, a door inner-side portion 220 of a vehicle 200 is displayed on a navigation display 131.

The door inner-side portion 220 is provided with an armrest 221, a pocket 223, and a door open/close button 161 (electric unlocking mechanism 160). The door open/close button 161 is disposed on the armrest 221. A lever 171 is disposed in the pocket 223. Note that the door open/close button 161 and the lever 171 are included in the electric unlocking mechanism 160 and a physical unlocking mechanism 170, respectively.

Pressing the door open/close button 161 controls the electric unlocking mechanism 160 and the door 210 is electrically unlocked. Note that the door 210 in the unlocked state is opened by pressing the door open/close button 161 once. Also, the door 210 in the locked state is opened by pressing the door open/close button 161 twice.

When the lever 171 (physical unlocking mechanism 170) disposed in the pocket 223 is pulled upward, the door 210 is physically unlocked by the physical unlocking mechanism 170. Note that the lever 171 is disposed at a position spaced away from the door open/close button 161.

In the screen illustrated in FIG. 8, an enlarged screen 131*a*, illustrating details of how to operate the lever 171, is displayed. An arrow 131*b*, indicating how to operate the lever 171, is displayed on the enlarged screen 131*a*.

Figure 9:
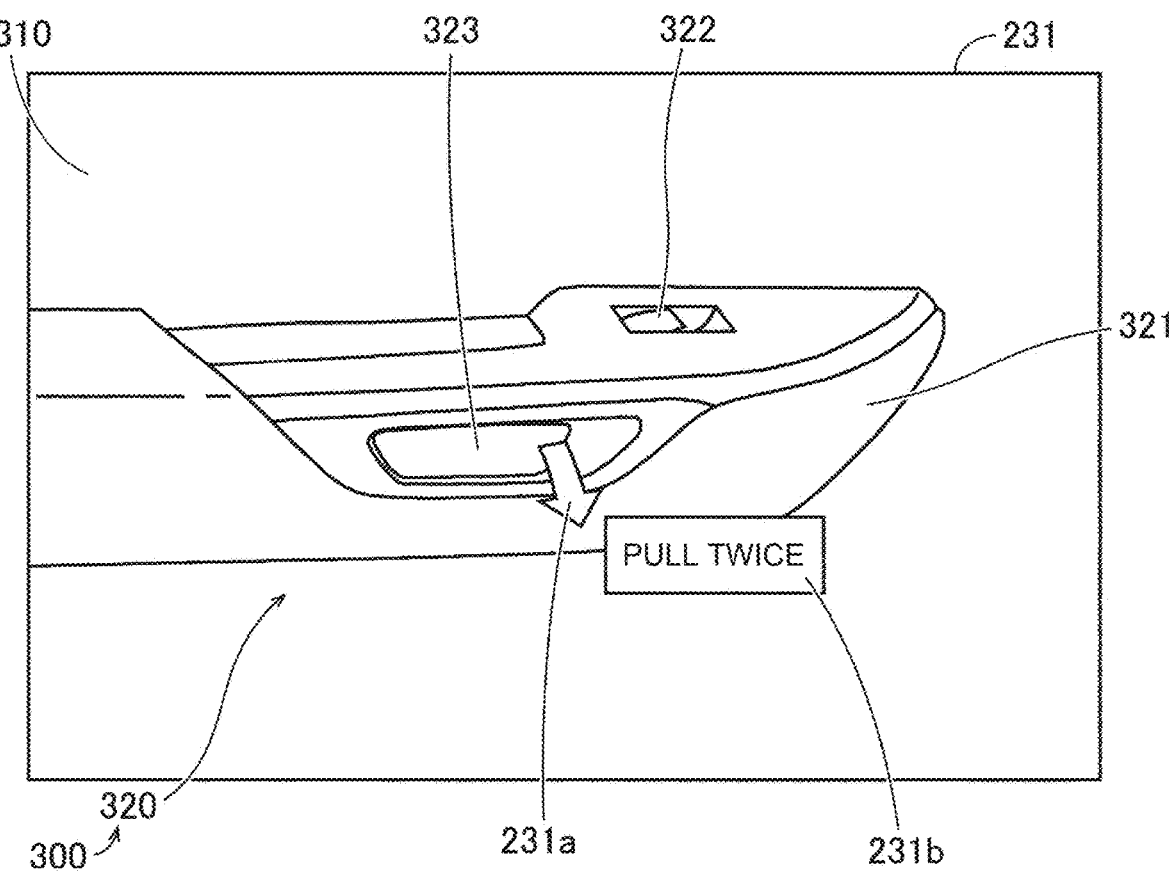
FIG. 9 is a diagram illustrating a second modification of FIG. 4.

FIG. 9 is a diagram illustrating a second modification of the image in FIG. 4. In the example illustrated in FIG. 9, a door inner-side portion 320 of a vehicle 300 is displayed on a navigation display 231.

The door inner-side portion 320 is provided with an armrest 321, a window button 322, and a door unlocking lever 323. The armrest 321 is provided with the window button 322 and the door unlocking lever 323.

In the example illustrated in FIG. 9, the door unlocking lever 323 is included in each of the electric unlocking mechanism and the physical unlocking mechanism (signs omitted for both). Specifically, when the door unlocking lever 323 is pulled once, the electric unlocking mechanism is controlled and the door 310 is unlocked. Also, when the door unlocking lever 323 is pulled twice, the door 310 is unlocked by the physical unlocking mechanism.

The screen illustrated in FIG. 9 displays an arrow 231*a* and an explanatory message 231*b* for describing how to physically unlock using the door unlocking lever 323. Note that the explanatory message 231*b* states "Pull twice".

In the above embodiment, an example is described in which the annunciation processing is executed by displaying information regarding the physical unlocking mechanism 70 on the navigation display 31 of the vehicle 100, but the present disclosure is not limited thereto. Information regarding the physical unlocking mechanism 70 may be displayed on the meter display 32, or alternately, annunciation of information regarding the physical unlocking mechanism 70 may be performed by audio from the speaker 33.

Figure 10:
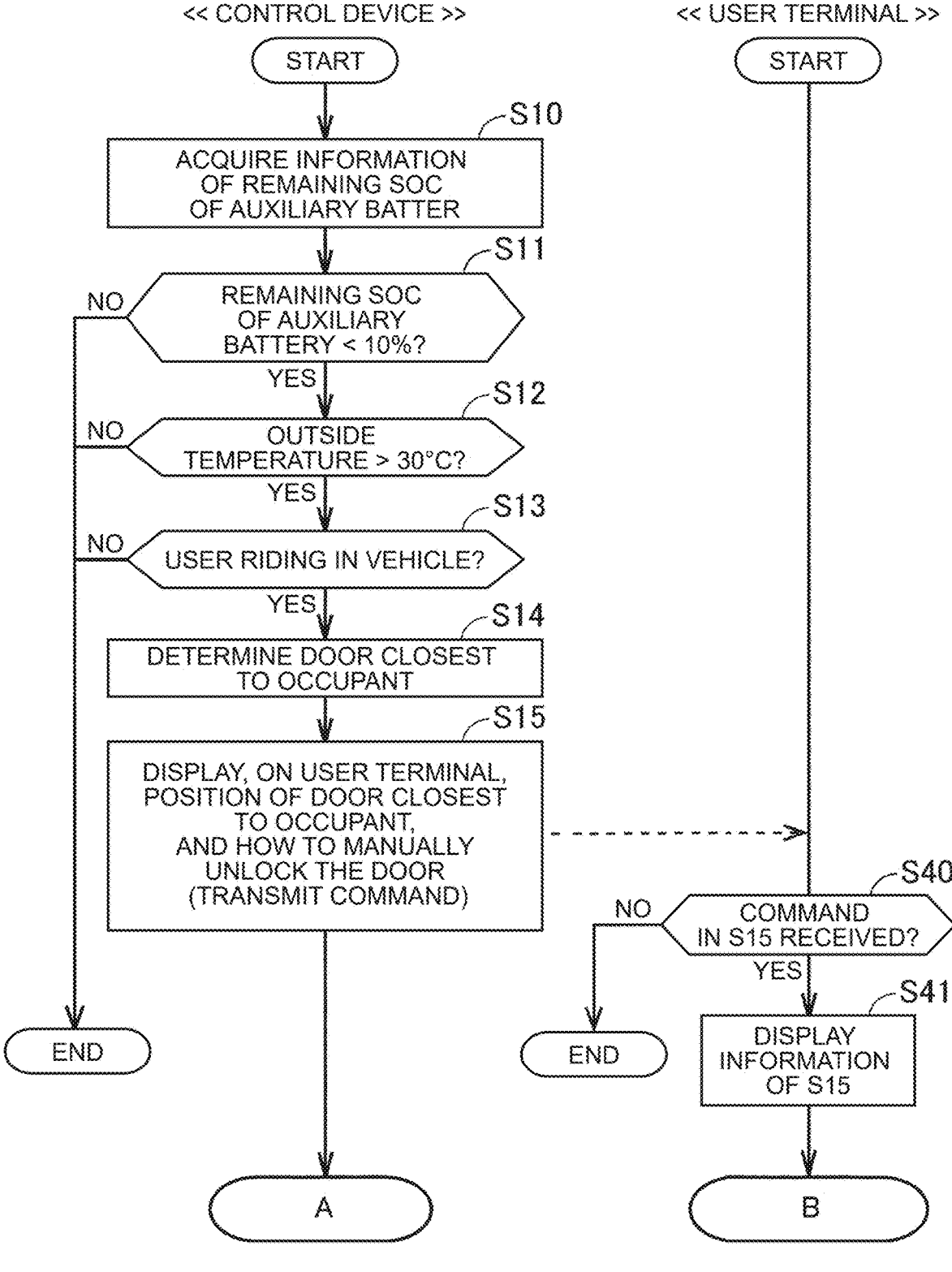
FIG. 10 is a diagram showing a modification of the sequence diagram of FIG. 3.
Figure 11:
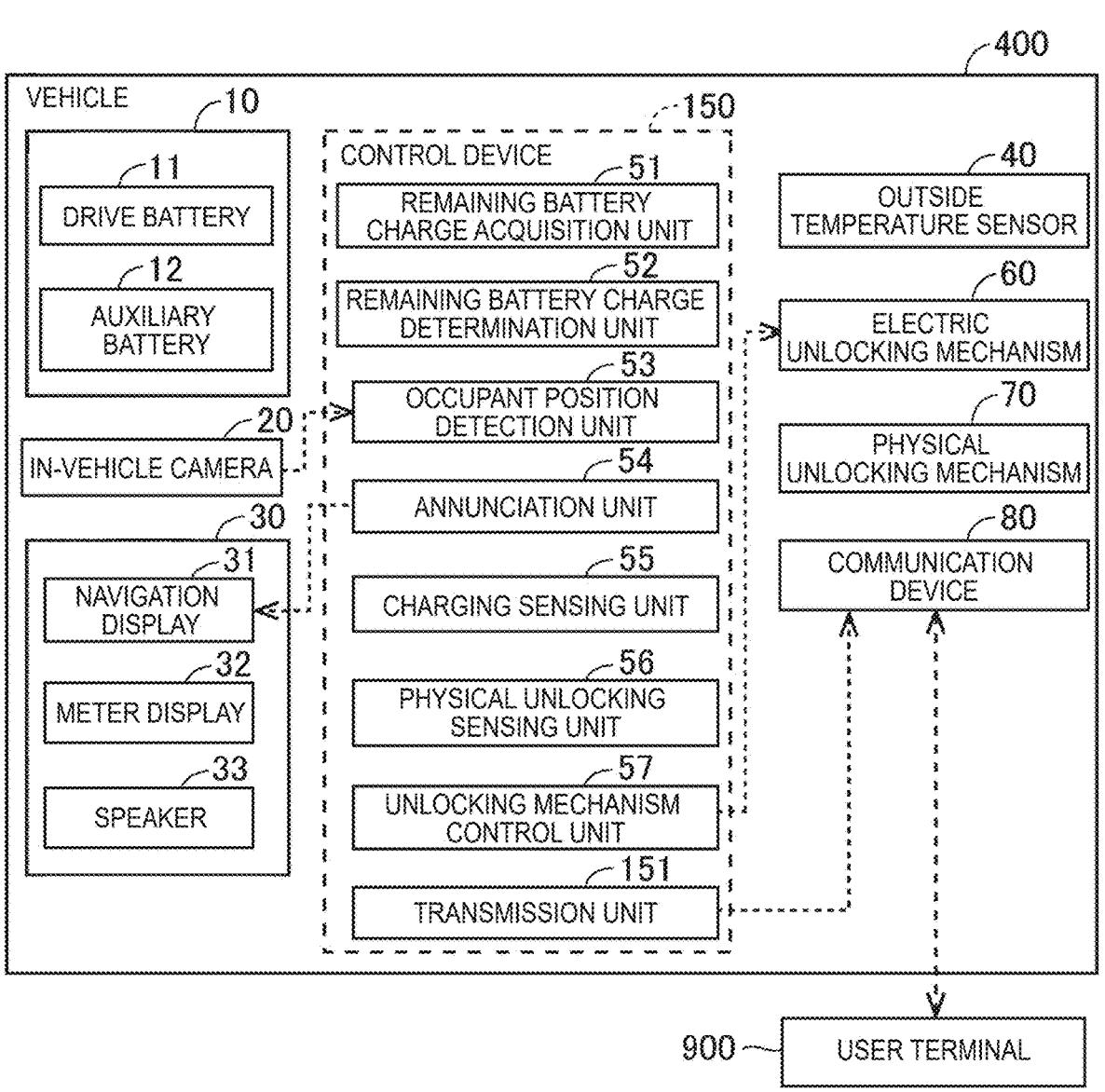
FIG. 11 is a block diagram illustrating a detailed configuration of a vehicle according to a modification of the embodiment.

Further, information regarding the physical unlocking mechanism 70 (images in FIG. 4 and so forth) may be displayed on the user terminal 900. FIG. 10 is a diagram showing a modification in which the command (control signal) in step S15 in the above embodiment is transmitted to the user terminal 900. A control device 150 (transmission unit 151) (see FIG. 11) of a vehicle 400 controls the communication device 80 so as to transmit information regarding the position of the physical unlocking mechanism 70 corresponding to the door 110 and how to unlock the door 110 by the physical unlocking mechanism 70, to the user terminal 900. The user terminal 900 that has received the command (control signal) executes processing of steps S40 to S41, which are similar to steps S30 to S31 (see FIG. 3). Detailed description of steps S40 to S41 will be omitted. In this case, a central processing unit (CPU) or the like, which is omitted from illustration and is provided in the user terminal 900, is an example of "control device" in the present disclosure. Also, the user terminal 900 is an example of "external device" in the present disclosure. Also, the transmission unit 151 is an example of "transmission circuit" in the present disclosure.

Figure 12:
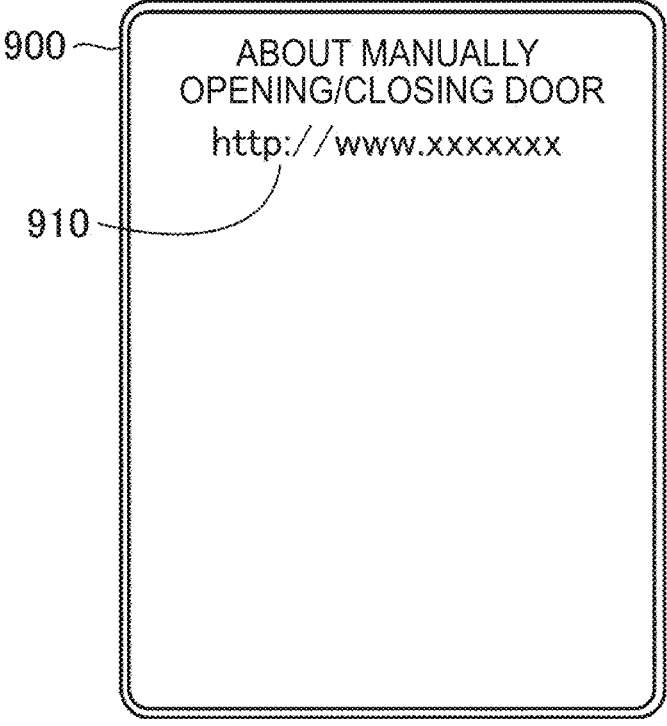
FIG. 12 is a diagram illustrating a Uniform Resource Locator (URL) of a Web page containing information regarding a physical unlocking mechanism being displayed on a user terminal.

Note that FIG. 12 is a diagram illustrating a URL 910 of a Web page, containing information regarding the physical unlocking mechanism 70, displayed on the user terminal 900.

Also, although an example in which information regarding the physical unlocking mechanism 70 is transmitted to the user terminal 900 is set forth in the example in FIG. 10, the present disclosure is not limited to this. Information regarding the physical unlocking mechanism 70 may be transmitted from the control device 150 (transmission unit 151) of the vehicle 400 to an external server that is omitted from illustration, via the communication device 80. A command (control signal) to display the information on the display screen of the user terminal 900 may then be transmitted from the external server to the user terminal 900. In this case, the external server is an example of "external device" in the present disclosure.

Also, at least part of the control executed by the control device 50 of the embodiment described above may be executed in the user terminal 900 or the external server. For example, the SOC information of the auxiliary battery 12 may be acquired in the vehicle, and also the user terminal 900 or the external server that has received the SOC information from the vehicle may execute the annunciation processing.

Also, in the embodiment described above, an example is set forth in which the vehicle 100 is an electrified vehicle such as a BEV, a PHEV, or the like, but the present disclosure is not limited thereto. For example, the vehicle may be a gasoline vehicle, as long as it is equipped with a battery.

The embodiments disclosed herein should be construed as exemplary in all respects and not restrictive. The scope of the present disclosure is set forth in the claims rather than in the above description of the embodiments, and is intended to include all modifications within the meaning and scope equivalent to those of the claims.

What is claimed is:

1. A control device of a vehicle that includes a door, an electric unlocking mechanism that is supplied with electric power from a battery installed in the vehicle and that also electrically unlocks the door, and a physical unlocking mechanism for manually unlocking the door, the control device comprising: an annunciation circuit for performing annunciation of predetermined information to a user of the vehicle, wherein the annunciation circuit is configured to, when an amount of charge of the battery is smaller than a predetermined threshold value, perform annunciation to the user of at least one piece of information of a position of the physical unlocking mechanism, and how to unlock the door by the physical unlocking mechanism.

2. The control device according to claim 1, wherein the annunciation circuit causes a display device to display the at least one piece of information when the amount of charge is smaller than the predetermined threshold value.

3. The control device according to claim 2, wherein the display device includes at least one of a display installed in the vehicle and a user terminal not installed in the vehicle.

4. The control device according to claim 1, wherein:

the door includes a proximity door located closest to the user riding in the vehicle; and the annunciation circuit is configured to, when the amount of charge is smaller than the predetermined threshold value, perform annunciation of at least one piece of information of a position of the physical unlocking mechanism corresponding to the proximity door, and how to unlock the proximity door by the physical unlocking mechanism, to the user.

5. The control device according to claim 1, wherein the annunciation circuit is configured to end annunciation of the at least one piece of information to the user when the door is unlocked by the physical unlocking mechanism while annunciation of the at least one piece of information is being performed to the user.

6. The control device according to claim 1, wherein the annunciation circuit is configured to end annunciation of the at least one piece of information to the user when charging of the battery is started while annunciation of the at least one piece of information is being performed to the user.

7. The control device according to claim 1, further comprising: an unlocking mechanism control circuit configured to drive the electric unlocking mechanism, wherein the unlocking mechanism control circuit is configured to unlock the door by the electric unlocking mechanism when the door is not unlocked by the physical unlocking mechanism within a predetermined amount of time following annunciation of the at least one piece of information being performed to the user.

8. The control device according to claim 1, wherein the annunciation circuit is configured to perform annunciation of the at least one piece of information to the user when the user is riding in the vehicle and also the amount of charge is smaller than the predetermined threshold value.

9. The control device according to claim 1, wherein the annunciation circuit is configured to perform annunciation of the at least one piece of information to the user when an outside temperature is higher than a predetermined temperature and also the amount of charge is smaller than the predetermined threshold value.

10. A control device of a vehicle that includes a door, an electric unlocking mechanism that is supplied with electric power from a battery installed in the vehicle and that also electrically unlocks the door, and a physical unlocking mechanism for manually unlocking the door, the control device comprising: a transmission circuit for transmitting information of the vehicle to an external device that is outside of the vehicle, wherein the transmission circuit is configured to, when an amount of charge of the battery is smaller than a predetermined threshold value, transmit, to the external device, at least one piece of information of a position of the physical unlocking mechanism, and how to unlock the door by the physical unlocking mechanism.

11. A control method of a vehicle that includes a door, an electric unlocking mechanism that is supplied with electric power from a battery installed in the vehicle and that also electrically unlocks the door, a physical unlocking mechanism for manually unlocking the door, and a control device, the control method comprising: as an annunciation process, the control device performing annunciation of predetermined information to a user of the vehicle, wherein the annunciation process includes a process of performing annunciation to the user of at least one piece of information of a position of the physical unlocking mechanism, and how to unlock the door by the physical unlocking mechanism, when an amount of charge of the battery is smaller than a predetermined threshold value.

12. The control method according to claim 11, wherein the annunciation process includes a process of the control device causing a display device to display the at least one piece of information when the amount of charge is smaller than the predetermined threshold value.

13. The control method according to claim 12, wherein the annunciation process includes a process of the control device causing the display device, including at least one of a display installed in the vehicle and a user terminal not installed in the vehicle, to display the at least one piece of information, when the amount of charge is smaller than the predetermined threshold value.

14. The control method according to claim 11, wherein:

the door includes a proximity door located closest to the user riding in the vehicle; and the annunciation process includes a process of the control device performing annunciation to the user of at least one piece of information of a position of the physical unlocking mechanism corresponding to the proximity door, and how to unlock the proximity door by the physical unlocking mechanism, when the amount of charge is smaller than the predetermined threshold value.

15. The control method according to claim 11, further comprising: the control device ending annunciation of the at least one piece of information to the user, when the door is unlocked by the physical unlocking mechanism while annunciation of the at least one piece of information is being performed to the user.

16. The control method according to claim 11, further comprising: the control device ending annunciation of the at least one piece of information to the user, when charging of the battery is started while annunciation of the at least one piece of information is being performed to the user.

17. The control method according to claim 11, further comprising: the control device unlocking the door by the electric unlocking mechanism, when the door is not unlocked by the physical unlocking mechanism within a predetermined amount of time following annunciation of the at least one piece of information being performed to the user.

18. The control method according to claim 11, wherein the annunciation process includes a process of the control device performing annunciation of the at least one piece of information to the user when the user is riding in the vehicle and also the amount of charge is smaller than the predetermined threshold value.

19. The control method according to claim 11, wherein the annunciation process includes a process of the control device performing annunciation to the user of the at least one piece of information when an outside temperature is higher than a predetermined temperature and also the amount of charge is smaller than the predetermined threshold value.

20. The control method according to claim 11, wherein the annunciation process includes a process of the control device transmitting the at least one piece of information to an external device that is outside of the vehicle when the amount of charge is smaller than the predetermined threshold value.

* * * * *